US008472368B2

(12) United States Patent
Baldemair et al.

(10) Patent No.: US 8,472,368 B2
(45) Date of Patent: Jun. 25, 2013

(54) METHOD AND ARRANGEMENTS IN A COMMUNICATION SYSTEM

(75) Inventors: Robert Baldemair, Solna (SE); Dirk Gerstenberger, Stockholm (SE); Daniel Larsson, Solna (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 40 days.

(21) Appl. No.: 12/937,440

(22) PCT Filed: Apr. 1, 2010

(86) PCT No.: PCT/SE2010/050368
§ 371 (c)(1),
(2), (4) Date: Aug. 4, 2011

(87) PCT Pub. No.: WO2011/046486
PCT Pub. Date: Apr. 21, 2011

(65) Prior Publication Data
US 2011/0292887 A1    Dec. 1, 2011

Related U.S. Application Data

(60) Provisional application No. 61/250,962, filed on Oct. 13, 2009.

(51) Int. Cl.
*H04B 7/185* (2006.01)
*H04W 4/00* (2009.01)
*H04B 1/16* (2006.01)
*H04B 7/00* (2006.01)

(52) U.S. Cl.
USPC ......... 370/318; 370/329; 455/343.5; 455/522

(58) Field of Classification Search
USPC ................. 370/318, 329; 455/343.5, 522
See application file for complete search history.

(56) References Cited

FOREIGN PATENT DOCUMENTS
WO    WO2007/112762    * 10/2007

OTHER PUBLICATIONS

NTT Docomo, Comparison of PDCCH Transmission and Coding Schemes for LTE-Advanced, 3GPP Draft R1-090895, Feb. 9, 2009, 3GPP TSG RAN WG1 Meeting #56, Athens, GR.
ZTE, Primary and Secondary PDCCH Design for LTE-A, 3GPP Draft R1-092227, May 7, 2009, 3GPP TSG-RAN WG1 Meeting #57, San Francisco, CA, US.
Panasonic, PDCCH design for carrier aggregation, 3GPP Draft R1-092230, May 8, 2009, 3GPP TSG-RAN WG1 Meeting #57, San Francisco, CA, US.

(Continued)

Primary Examiner — Ronald Abelson
(74) Attorney, Agent, or Firm — Potomac Patent Group PLLC (57) ABSTRACT

Methods and arrangements in a network node and mobile terminal, respectively, in a wireless communication system supporting aggregation of component carriers. The method in a network node involves, when resources on at least two downlink component carriers are being assigned to a mobile terminal at the same time, allocating (908) control information bits not related to power control in a bit field, which is normally used for power control in a message on a physical downlink control channel associated with one of said at least two downlink component carriers. The method in a mobile terminal involves, using control information bits not related to power control obtained from a bit field, which is normally used for power control in a message on a physical downlink control channel associated with one of said at least two downlink component carriers, for locating information related to downlink or uplink transmissions.

24 Claims, 9 Drawing Sheets

OTHER PUBLICATIONS

Motorola, PDCCH Design for Carrier Aggregation and Post Rel-8 Features, 3GPP Draft R1-093417, Aug. 24, 2009, 3GPP TSG RAN1 Meeting #58, Shenzen, CN.

EPO, Int'l Prelim. Report on Patentability in PCT/SE2010/050368, Jan. 30, 2012.
EPO, Int'l Search Report in PCT/SE2010/050368, Aug. 12, 2010.

* cited by examiner

METHOD AND ARRANGEMENTS IN A COMMUNICATION SYSTEM

TECHNICAL FIELD

The invention relates to transmission of control information in a communication system, and especially to adapting said transmission to the requirements following the enabling of carrier aggregation.

BACKGROUND

Figure 1:
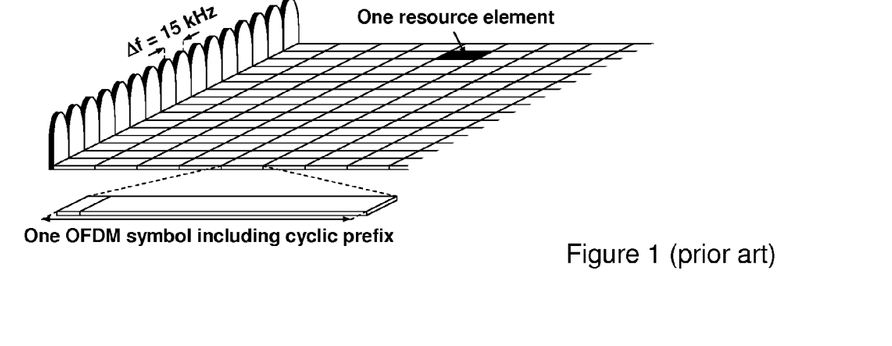
FIG. 1 is a schematic view illustrating an LTE time-frequency grid, according to the prior art.

In LTE (Long Term Evolution), OFDM (Orthogonal Frequency Division Multiplexing) is used in the downlink and DFT-spread (Discrete Fourier Transform) OFDM is used in the uplink. The basic LTE downlink physical resource can thus be seen as a time-frequency grid as illustrated in FIG. 1, where each resource element corresponds to one OFDM subcarrier during one OFDM symbol interval.

Figure 2:
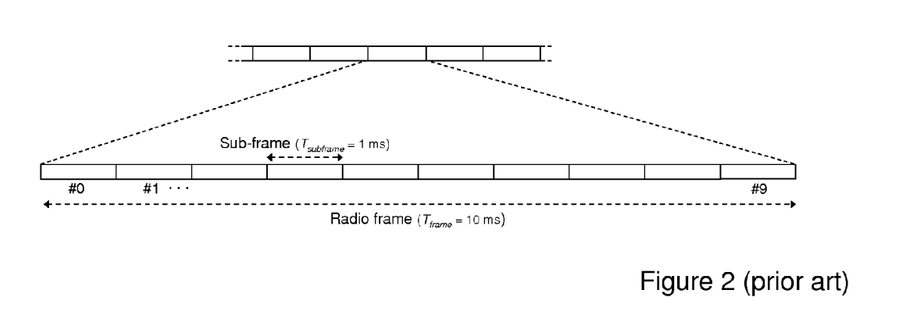
FIG. 2 is a schematic view illustrating an LTE radio frame, according to the prior art.
Figure 3:
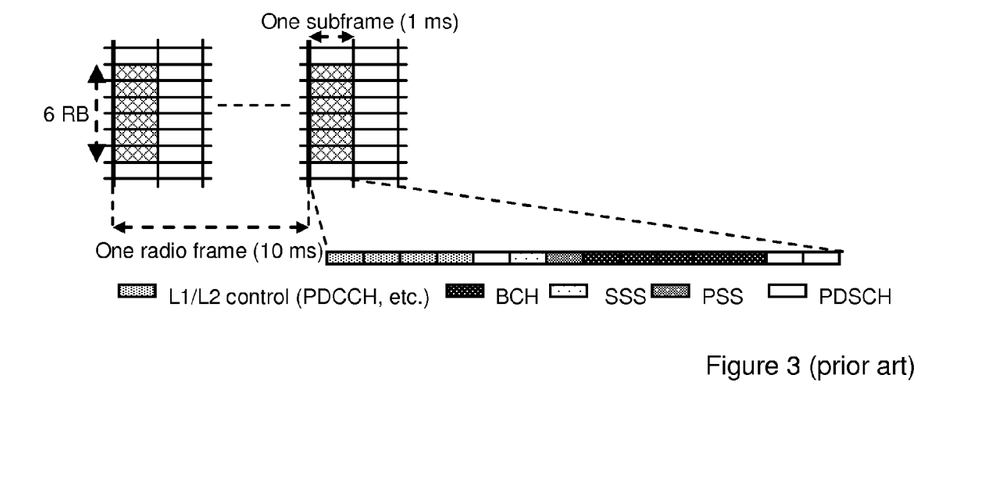
FIG. 3 is a schematic view illustrating the location of certain downlink channels in LTE, according to the prior art.

In the time domain, LTE downlink transmissions are organized into radio frames of 10 ms, where each radio frame consists of ten equally-sized subframes of length $T_{subframe}=1$ ms, as illustrated in FIG. 2.

Furthermore, the resource allocation in LTE is typically described in terms of resource blocks, where a resource block corresponds to one slot of 0.5 ms in the time domain and 12 contiguous subcarriers in the frequency domain. Resource blocks are numbered in the frequency domain, starting with 0 from one end of the system bandwidth.

Figure 4:
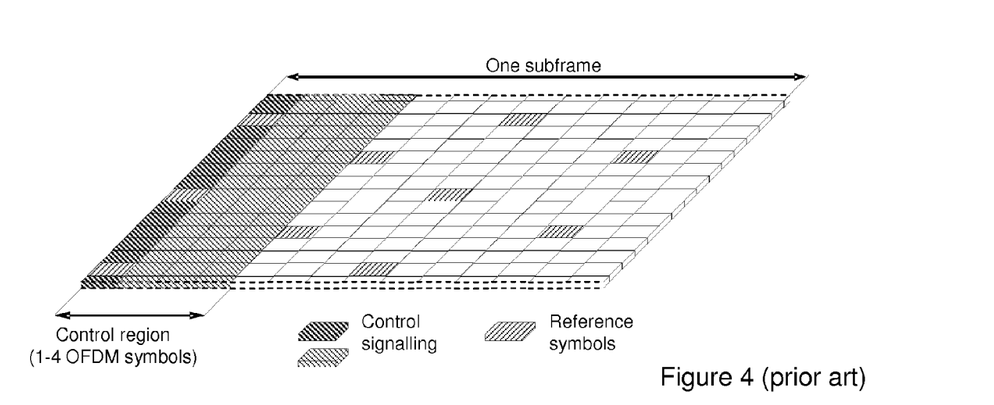
FIG. 4 is a schematic view illustrating a downlink LTE subframe, according to the prior art.

Downlink transmissions are dynamically scheduled in LTE, i.e., in each subframe, a base station transmits control information concerning which mobile terminals data is transmitted to, and upon which resource blocks the data is transmitted in the current downlink subframe. Typically, this control signaling is transmitted in the first 1, 2, 3 or 4 OFDM symbols in each subframe. A downlink system with 4 OFDM symbols as control region is illustrated in FIG. 4.

In LTE, hybrid-ARQ is used, where, after receiving downlink data in a subframe, a mobile terminal attempts to decode it and reports to a base station whether the decoding was successful or not. When the decoding has been successful, the report comprises an "ACK" (ACKnowledgment), and when the decoding was not successful, the report comprises a "NAK" (Negative AcKnowledgment). In case of an unsuccessful decoding attempt, the base station can retransmit the erroneous data.

LTE uplink control signaling from a mobile terminal to a base station comprises:
  hybrid-ARQ acknowledgements for received downlink data;
  mobile terminal reports related to the downlink channel conditions, to be used as assistance for the downlink scheduling; and
  scheduling requests, indicating that a mobile terminal needs uplink resources for uplink data transmissions.

When a mobile terminal has not been assigned an uplink resource for data transmission, the L1/L2 (Layer1/Layer2) control information, i.e., channel-status reports, hybrid-ARQ acknowledgments and scheduling requests, is transmitted in uplink resources, i.e. resource blocks, specifically assigned for uplink L1/L2 control on a Physical Uplink Control CHannel (PUCCH). As illustrated in FIG. 6, these resources are located at the edges of the total available cell uplink transmission bandwidth. Each such resource consists of 12 subcarriers, i.e., one resource block, within each of the two slots of an uplink subframe. In order to provide frequency diversity, these frequency resources may be shifted between different parts of the spectrum at the slot boundary, using so called frequency hopping, as illustrated in FIG. 5.

Figure 5:
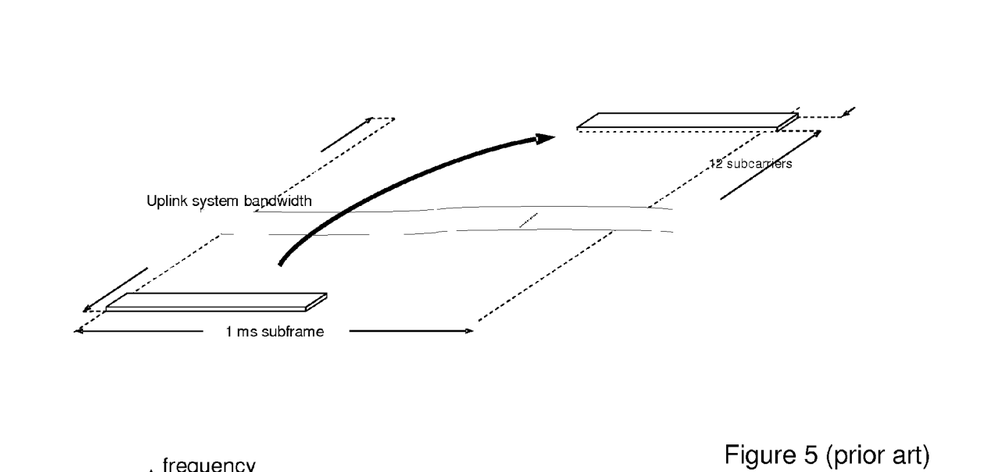
FIG. 5 is a schematic view illustrating a shift of a physical uplink control channel (PUCCH) in LTE, according to the prior art.
Figure 6:
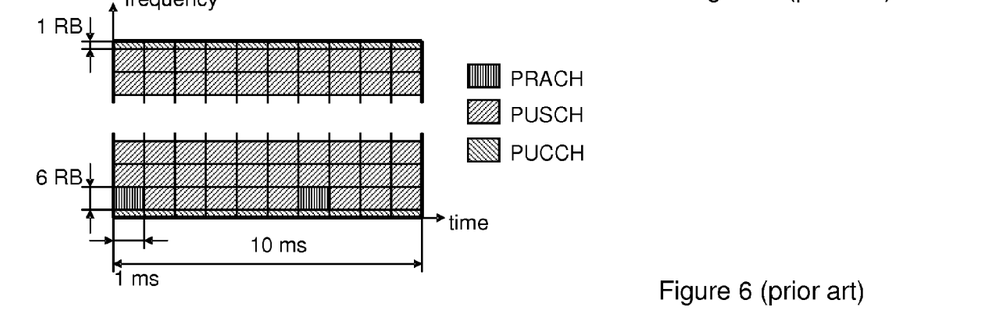
FIG. 6 is a schematic view illustrating the location of different uplink channels in LTE, according to the prior art.

FIG. 5 shows an example of frequency hopping in the uplink, with one resource consisting of 12 subcarriers at the upper part of the spectrum within the first slot of a subframe and an equally sized resource at the lower part of the spectrum during the second slot of the subframe. If more resources are needed for the uplink L1/L2 control signaling, e.g. in case of very large overall transmission bandwidth supporting a large number of users, additional resource blocks can be assigned next to the previously assigned resource blocks.

The reasons for locating the PUCCH resources at the edges of the overall available spectrum are two-fold:
  Together with the frequency hopping described above, the location at the edges maximizes the frequency diversity experienced by the control signaling, and
  Assigning uplink resources for the PUCCH at other positions within the spectrum, i.e. not at the edges, would fragment the uplink spectrum, making it impossible to assign very wide transmission bandwidths to a single mobile terminal and still retain the single-carrier property of the uplink transmission The bandwidth of one resource block during one subframe is larger than the control signaling needs of a single terminal. Therefore, to efficiently exploit the resources set aside for control signaling, multiple terminals can share the same resource block. This is done by assigning the different terminals different orthogonal phase rotations of a cell-specific length-12 frequency-domain sequence and/or different orthogonal time-domain covers covering the subframes within a slot or subframe.

Figure 7:
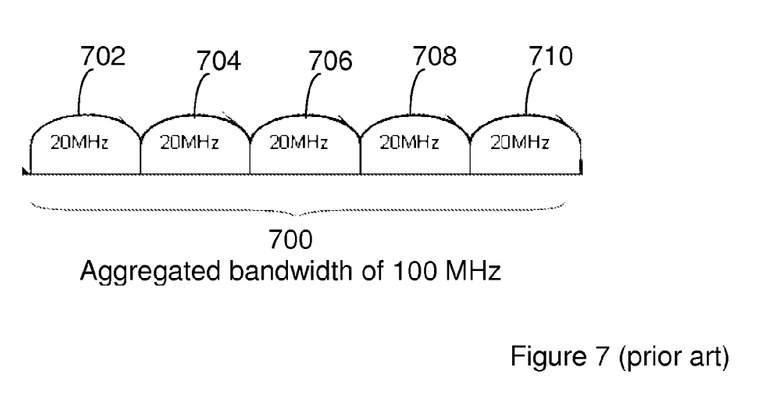
FIG. 7 is a schematic view illustrating carrier aggregation, according to the prior art.
Figure 8:
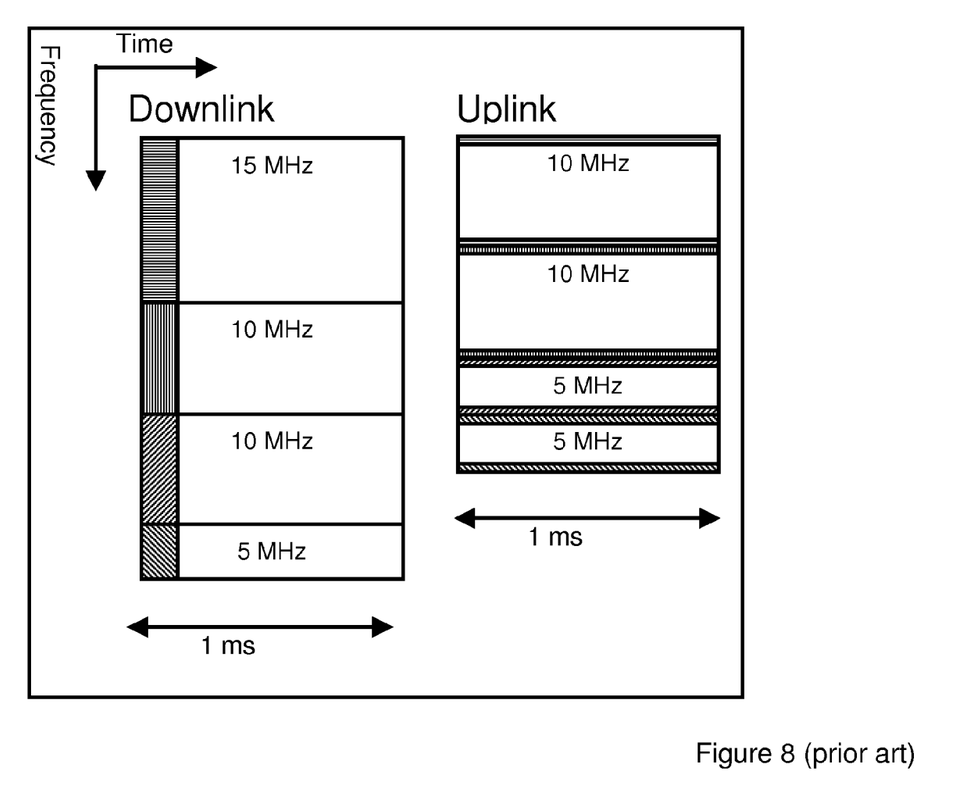
FIG. 8 is a schematic view illustrating LTE carriers of different bandwidth and the location of control information, according to the prior art.

The LTE Release-8 standard supports bandwidths up to 20 MHz. In order to meet the IMT-Advanced requirements, bandwidths larger than 20 MHz need to be supported. However, one important requirement is to assure backward compatibility with LTE Release-8 for legacy terminals. This should also include spectrum compatibility. That would imply that an LTE-Advanced carrier should appear as a number of LTE carriers to an LTE Release-8/9 terminal. Each such carrier can be referred to as a component carrier (CC). FIG. 7 shows a schematic view illustrating five component carriers 702-710 of 20 MHz each, together forming an aggregated bandwidth 700 of 100 MHz. In particular for early LTE-Advanced deployments it can be expected that there will be a smaller number of LTE-Advanced-capable terminals as compared to the number of LTE legacy terminals in use. Therefore, it is necessary to assure an efficient use of a wide carrier also for legacy terminals, i.e. making it possible to implement carriers where legacy terminals can be scheduled in all parts of a wideband LTE-Advanced carrier. The straightforward way to obtain this would be by means of carrier aggregation. Carrier aggregation implies that an LTE-Advanced terminal can receive multiple CCs, where each CC has, or is at least able to have, the same structure as a Release-8 carrier.

Scheduling of a CC is done on the Physical Downlink Control Channel (PDCCH) via downlink assignments. Control information on the PDCCH is formatted as a Downlink Control Information (DCI) message comprising predetermined bit fields for different types of control information. DCI messages for downlink assignments contain, among other things, resource block assignment, modulation and coding scheme related parameters, hybrid-ARQ redundancy version, etc. In addition to parameters relating to the actual downlink transmission, most DCI formats for downlink assignments also contain a bit field for carrying Transmit Power Control (TPC) commands. These TPC commands are used to control the uplink power of the corresponding Physical Uplink Control Channel (PUCCH) that is used by terminals to transmit the hybrid-ARQ feedback.

The fact that an LTE-Advanced terminal could be assigned more resources than a legacy terminal, and on several component carriers, increases the need for control information, e.g. since more resources need to be addressed, and more feedback needs to be transmitted, as compared to a Release-8 scenario. For example, in Release-8 FDD, the number of ACK/NAK bits to be transmitted in the uplink as a response to a downlink assignment/transmission is limited to 1 bit for single code word, and 2 bits for dual code word transmission, while in Release-10, when a mobile terminal, also denoted UE (User Equipment), is assigned e.g. 3 downlink component carriers, the ACK/NAKs associated with these component carriers will require no less than 3 bits assuming single code word, and 6 bits assuming dual code word transmission on all component carriers, respectively. When the case when a mobile terminal does not receive any assignment(s) on one or multiple component carriers also shall be included in the feedback structure, the number of required feedback bits increases even further, to 5 and 7 bits, respectively, assuming again single code word and dual code word transmission, respectively, on all three component carriers. The event that an assignment, even though scheduled, is not received by a mobile terminal is referred to as DTX.

The component carriers can be of different bandwidths, e.g. 5, 10 or 20 MHz, and thus comprise different amounts of resources, which need to be addressed. A wide component carrier will therefore require more control bits for addressing the resources within the carrier than a comparatively narrow component carrier. These differences depending on the bandwidth of CCs or amount of assigned resources on each CC could be solved by using differently sized control messages, comprising an addressing space which corresponds to the current resource conditions. However, such a solution would require much processing of a receiver, in terms of blind detection of control messages.

In LTE, a mobile terminal has to blindly decode DCI control messages to establish if it is currently scheduled. To reduce the complexity, a mobile terminal may be instructed to only monitor, i.e. blindly decode, DCI message formats of certain payload sizes. Forcing a mobile terminal to monitor DCI formats with a large variety of payload sizes increases the number of blind decodings a mobile terminal has to perform and thus also the mobile terminal complexity.

In order to maintain or reduce blind detection, it is desirable to have control messages and e.g. address fields of equal size. This implies that an address field suitable for addressing the resources within a 5 MHz component carrier will be too scarce for addressing the resources within a 20 MHz component carrier, and an address field large enough to address the resources within a 20 MHz component carrier will be unnecessarily large for addressing the resources within a 5 MHz component carrier. Thus, a too small addressing space will only allow for a rough addressing in wide CCs, while a larger addressing space will waste resources when used for relatively narrow component carriers.

Consequently, it is a problem how to provide additional control information without increasing resource waste, causing insufficient addressing or increasing the burden of blind detection in a receiver.

SUMMARY

It would be desirable to enable conveyance of additional control information without increasing resource waste, causing insufficient addressing or increasing the burden of blind detection in a receiver. It is an object of the invention to address at least some of the issues outlined above. Further, it is an object of the invention to provide methods and arrangements for enabling conveyance of additional control information.

According to a first aspect, a method is provided in a network node. Within the method, information bits related to power control of a physical uplink control channel are allocated in a bit field for power control, in a message on a first physical downlink control channel associated with a first downlink component carrier. When resources on at least two downlink component carriers are being assigned to a mobile terminal at the same time, other control information bits, not related to power control, are allocated in a bit field, corresponding to the bit field used for power control in the message on the first physical downlink control channel, in a message on a second physical downlink control channel associated with a second one of said at least two downlink component carriers. The allocated control information is then transmitted to the mobile station.

According to a second aspect, an arrangement is provided in a network node. The arrangement comprises a functional unit adapted to determine if resources on at least two downlink component carriers are being assigned to a mobile terminal at the same time. The arrangement further comprises a functional allocating unit adapted to allocate bits related to power control of a physical uplink control channel, in a bit field for power control in a message to be transmitted on a first physical downlink control channel associated with a first downlink component carrier. The functional allocating unit is further adapted to allocate bits when it has been determined that resources on at least two downlink component carriers are being assigned to a mobile terminal, allocate other control information bits not related to power control in a bit field, corresponding to the bit field used for power control in the message on the first physical downlink control channel, in a message on a second physical downlink control channel associated with a second one of said at least two downlink component carriers. The arrangement further comprises a functional unit, adapted to transmit the allocated control information to the mobile terminal being assigned the resources on the at least two downlink component carriers The above described method and arrangement may be used for e.g. reducing the amount of downlink overhead in a wireless communication system supporting aggregation of component carriers, by utilizing certain resources normally used for power control, when anticipated to carry redundant information, for conveyance of other relevant non-redundant control information.

According to a third aspect, a method is provided in a mobile terminal.
Within the method bits related to power control of a physical uplink control channel are obtained from a bit field for power control in a message on a first physical downlink control channel associated with a first downlink component carrier. Further, when receiving assignments for resources on at least two downlink component carriers at the same time, other control information bits not related to power control are obtained from a bit field, corresponding to the bit field for power control in the message on the first physical downlink control channel, in a message on a second physical downlink control channel associated with a second one of said at least two downlink component carriers. The obtained other control information not related to power control is then used in the mobile terminal for locating information related to downlink or uplink transmissions.

According to a forth aspect, an arrangement is provided in a mobile terminal. The arrangement comprises a functional unit adapted to determine if resources on at least two downlink component carriers have been assigned to the mobile terminal at the same time. The arrangement further comprises a functional obtaining unit adapted to obtain bits related to power control, from a bit field for power control in a message on a first physical downlink control channel associated with a first downlink component carriers. The functional obtaining unit is further adapted to obtain, when it has been determined that resources on at least two downlink component carriers have been assigned to the mobile terminal, other control information bits not related to power control from a bit field, corresponding to the bit field for power control in the message on the first physical downlink control channel, in a message on a second physical downlink control channel associated with a second one of said at least two downlink component carriers. The arrangement further comprises a functional unit, adapted to use said obtained other control information not related to power control for locating information related to downlink or uplink transmissions.

The method and arrangement according to the third and fourth aspect may be used for supporting the reduction of downlink overhead in a wireless communication system supporting aggregation of component carriers, by interpreting information allocated in certain resources, which normally are used for power control, as other relevant non-redundant control information in certain situations.

The above methods and arrangements may be implemented in different embodiments. The control information bits not related to power control could be indicators to PUCCH or PUSCH resources; extensions of the resource assignment; or extension to other parameters that do not exist or are smaller in the message format used on the PDCCH conveying the bits related to power control. The identity of the PDCCH conveying the true TPC command is then determined in the mobile terminal in a corresponding way.

The identity of the physical downlink control channel which is to convey the bits related to power control could be configured or determined according to e.g. a set of rules. This identity could be explicitly or implicitly signaled from a network node to a mobile terminal.

BRIEF DESCRIPTION OF THE DRAWINGS

The invention will now be described in more detail by means of exemplary embodiments and with reference to the accompanying drawings, in which.

DETAILED DESCRIPTION

Briefly described, methods and arrangements are provided for utilizing certain unexpected resources, when anticipated to carry redundant information, for conveyance of other relevant non-redundant control information.

Within this document, some expressions will be used when discussing the procedure of utilizing certain available resources, some of which will be briefly defined here.

A certain bit field in the control signalling will be discussed, which may be referred to as the "former TPC bit field", the "bit field normally used for power control", the "available former TPC bit field", the "available legacy TPC bit field", etc. In e.g. LTE Release-8, this bit field is used for conveying a TPC command in a DCI message, i.e. the bit field where a legacy terminal would expect to find a TPC command. In e.g. LTE-Advanced, this bit field could be used to convey other relevant information in certain situations, which will be explained in more detail later.

The bit field described above comprises certain bits, which may be referred to as the "available TPC bits" or the "former TPC bits", when used for conveying other relevant information than power control commands.

The term "other relevant information", refers to "control information other than power control commands", and may also be denoted "control information not related to power control" or "non-redundant control information". The term "non-redundant control information" is used to distinguish the information from the redundant power control commands, which would otherwise be conveyed in the bit field described above.

The term "legacy", used for example in expressions like "legacy terminals", is used as referring to entities which operate according to a previously released version of a certain standard or protocol, such as for example Release-8 of LTE. The term "LTE-Advanced" used in expressions like "LTE-Advanced terminal" is here used as referring to entities which operate according to a more recent version of a standard or protocol, such as for example Release-10 of LTE.

When a UE is assigned one component carrier, a control message on the PDCCH of the component carrier will comprise a transmission power command (TPC), which controls the transmit power of the PUCCH, which is to carry the feedback to e.g. how the downlink information is received.

A valuable insight is that when multiple component carriers are being simultaneously assigned to a UE, each of the PDCCHs associated with the respective component carriers will carry a control message comprising the bit field used for TPC commands. If the feedback related to the different component carriers are to be transmitted on different physical uplink control channels, it is adequate for each PDCCH associated with an assigned downlink component carrier to comprise a TPC-command. From a UE perspective, both symmetric and asymmetric uplink/downlink CC configurations are supported. For some of the configurations, the possibility to transmit the uplink control information on multiple PUCCHs or multiple uplink CCs may be considered. However, this option is likely to result in higher UE power consumption and a dependency on specific UE capabilities. This option may also create implementation issues due to inter-modulation products, and would lead to generally higher complexity for implementation and testing.

Hence, it would be better if the transmission of PUCCH did not depend on the uplink/downlink CC configuration, and therefore, it has been agreed for LTE Release-10 to use the design principle that all uplink control information for a UE should be semi-statically mapped onto one specific uplink CC, a so called "anchor carrier" or uplink primary component carrier.

Thus, the feedback control information for all assigned component carriers should be transmitted over the same physical uplink control channel or at least on the same uplink component carrier. Consequently, multiple TPC-commands, one for each assigned CC, would effectively try to control the transmit power of the same physical uplink control channel or the same uplink component carrier. Even if different physical uplink control channels on the same uplink component carrier are used a single TPC-command would be sufficient. At the best, this would imply a waste of resources due to redundancy, or, at the worst, lead to unpredictable behavior of a UE, due to conflicting TPC-commands.

An insight of great value is thus that when multiple CCs are assigned to a UE, the control bits normally used for TPC-commands related to all but one CC could be used to convey other relevant control information. One PDCCH would still need to carry the true TPC-command.

There are several alternatives to what these freed former TPC-bits could be used for. For example, these bits could be used to signal which PUCCH or PUSCH resources that should be used to convey the hybrid-ARQ bits of the corresponding downlink shared channel transmissions. It would also be possible to combine the former TPC-bits from more than one CC. For example, the former TPC-bits of all other CCs, i.e. all but the one carrying the true TPC command, could be combined, and together form a wider bit field. This wider bit field could be used for addressing one large PUCCH or PUSCH resource out of a somewhat larger resource pool. Another possibility is that some parts of the PUCCH or PUSCH resource addresses are explicitly signaled in therefore reserved bit fields, and the remaining part is signaled via the former TPC bit fields. Further, implicit and explicit PUCCH or PUSCH resource signaling could be combined, e.g. by that some parts of the PUCCH or PUSCH resource addresses are explicitly signaled and the remaining part is implicitly indicated via, e.g. in which CC and/or in which control channel elements the PDCCH of the corresponding DL assignment is transmitted.

Another possibility is to use the available former TPC bit fields to extend resource block assignments. This is especially useful if the true TPC command is sent on the CC having the narrowest downlink system bandwidth. The PDCCH of a CC could be located in another CC. Without restrictions on which downlink CC that could be scheduled from which downlink CC, the number of blind decodings could become very large, since a terminal has to monitor possible PDCCH candidates for each downlink CC on each downlink CC. If the CCs have different transmission bandwidths the control messages, i.e. the DCI messages in LTE, have different sizes resulting in an increased number of blind detections.

Using the available former TPC bit fields in DCI message addressing wider downlink CCs to extend their resource block assignment fields, i.e. extending relative to the resource block assignment fields of the DCI addressing the CCs having the narrowest system bandwidth among all scheduled or configured CCs, makes it possible to address the resources on the wider CCs without increasing the DCI message size, relative to the DCI format that contains the true TPC command, given the true TPC command is sent on one of the CCs having the narrowest downlink system bandwidth among the CCs, and thus without increasing the number of blind decodings.

A similar situation occurs if different downlink CCs are configured with transmission modes requiring DCI messages of different sizes. When the true TPC command is sent on the downlink CC that requires the smallest DCI format, the former TPC bit fields of the other CCs could be used to convey information of larger DCI messages within the payload size of the smaller DCI messages. In this way a terminal does not have to monitor as many DCI payload sizes, and thus, a number of blind decodings could be avoided.

A further possibility is to use the available former TPC bits to indicate which component carrier that is addressed by a certain PDCCH, in case one DL CC carries multiple PDCCHs associated with different CCs, respectively. As an example, assuming that 5 component carriers are configured, and assuming a TPC bit field of size 2 per PDCCH. Further assuming that the 5 CCs are assigned to one mobile terminal, and that one of the CCs carries all of the 5 PDCCHs. The PDCCH associated with the DL CC carrying all of the PDCCHs includes the true TPC command. The other four PDCCHs could then include a 2 bit carrier indicator, indicating which of the four CCs that is addressed by the respective PDCCH.

Figure 9:
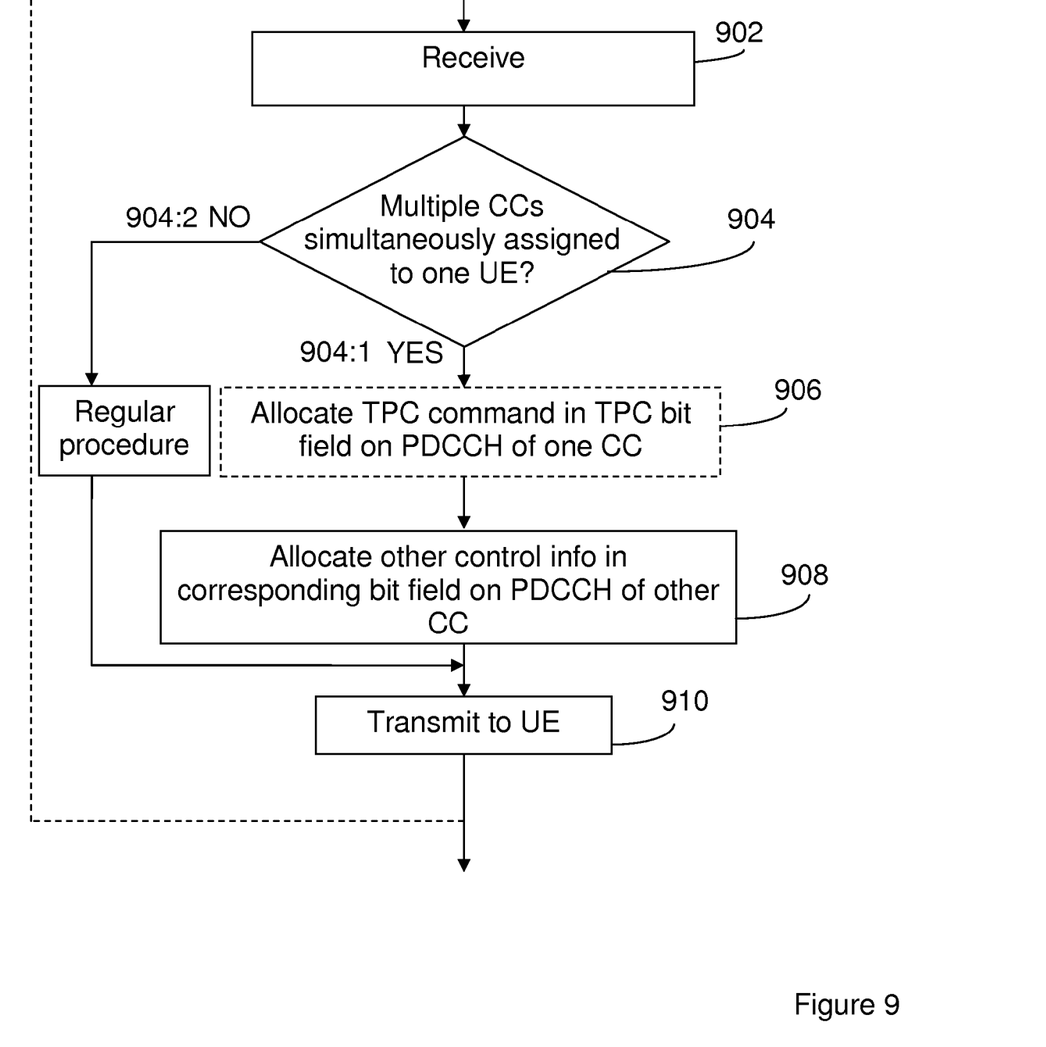
FIG. 9 is a flow chart illustrating procedure steps executed in a network node, according to an embodiment.

An embodiment in a network node of the procedure for utilizing certain resources, when anticipated to carry redundant information, for conveyance of other relevant non-redundant control information in a wireless communication system supporting aggregation of component carriers, will now be described with reference to FIG. 9. Initially, data is received in a step 902. The data could comprise e.g. mobile terminal reports related to the downlink channel conditions. Alternatively, the data is internal network node data, comprising information concerning component carrier assignments. Alternatively, the data correspond to data that should be transmitted to the mobile terminal.

Then, it is determined in a next step 904 if resources on at least two downlink component carriers are being assigned to a mobile terminal at the same time. When it is determined in step 904 that resources on at least two downlink component carriers are being assigned 904:1 to a mobile terminal, a predetermined number of bits related to power control of an physical uplink control channel are allocated, or assigned, in a next step 906, in a bit field for power control, in a message on a first physical downlink control channel associated with a first one of said at least two downlink component carriers. In current LTE terminology, these bits are referred to as a TPC command, and the message is referred to as a DCI message. Thus, in LTE, this is the true TPC command, but it may also be denoted differently, e.g. in other systems.

The bits related to power control are allocated in said bit field also when only resources on a single component carrier are assigned to a mobile terminal. Therefore, actions related to these bits could alternatively be performed in parallel to the described procedure, or before the evaluation of whether a mobile terminal has been assigned resources on more than one component carrier. Independently of where the allocating of power control bits is performed, a configuration, a set of rules or similar, concerning which CC that should carry the bits related to power control is required. The possibility of an alternative position of the action performed in step 906 is illustrated in FIG. 9 by that step 906 is outlined with a dashed line.

Then, in a next step 908, a predetermined number of control information bits related to other relevant information not related to power control are allocated in the corresponding bit field normally used for power control, in a message on a second physical downlink control channel associated with at least a second one of said at least two downlink component carriers. These bits could be related e.g. to indicating certain PUCCH or PUSCH resources, to extending resource block assignments or to indicating which component carrier that is addressed by a certain PDCCH. The allocated control information is then transmitted in a step 910 to the mobile terminal being assigned the resources on the at least two downlink component carriers.

Below, an exemplary arrangement 1000, adapted to enable the performance of the above described procedure in a network node, will be described with reference to FIG. 10. The arrangement 1000 comprises a receiving unit 1002, which is adapted to receive signals transmitted from other network entities or internal information, depending on what functions that are considered to be comprised in the arrangement 1000. The arrangement further comprises a determining unit 1004, adapted to determine if resources on at least two downlink component carriers are being assigned to a mobile terminal at the same time, i.e. for simultaneous use. The arrangement further comprises an allocating unit 1006, adapted to, when it has been determined that resources on at least two downlink component carriers are being assigned to a mobile terminal, allocate a predetermined number of bits related to power control of an physical uplink control channel, in a bit field for power control in a message on a first physical downlink control channel associated with a first one of said at least two downlink component carriers. In current LTE terminology, these bits are referred to as a TPC command, and the message is referred to as a DCI message. These bits related to power control are allocated in said bit field also when only resources on a single component carrier are assigned to a mobile terminal. Thus, the action related to these bits could alternatively be performed in parallel with the described procedure or before the evaluation of whether a mobile terminal has been assigned resources on more than one component carrier. Independently of where the allocating of power control bits is performed, a configuration, a set of rules or similar, concerning which CC that should carry the bits related to power control is required.

The allocating unit is further adapted to allocate a predetermined number of other relevant control information bits not related to power control in the corresponding bit field normally used for power control in a message on a second physical downlink control channel associated with at least a second one of said at least two downlink component carriers. That is, the allocating unit is adapted to place "non-power control" information in the bit field where a legacy terminal would expect to find a power control command. The bits not related to power control could be related e.g. to indicating certain PUCCH or PUSCH resources; to extending resource block assignments or to indicating which component carrier that is addressed by a certain PDCCH. The arrangement further comprises a transmitting unit 1008, adapted to transmit the allocated control information to the mobile terminal being assigned the resources on the at least two downlink component carriers.

Figure 10:
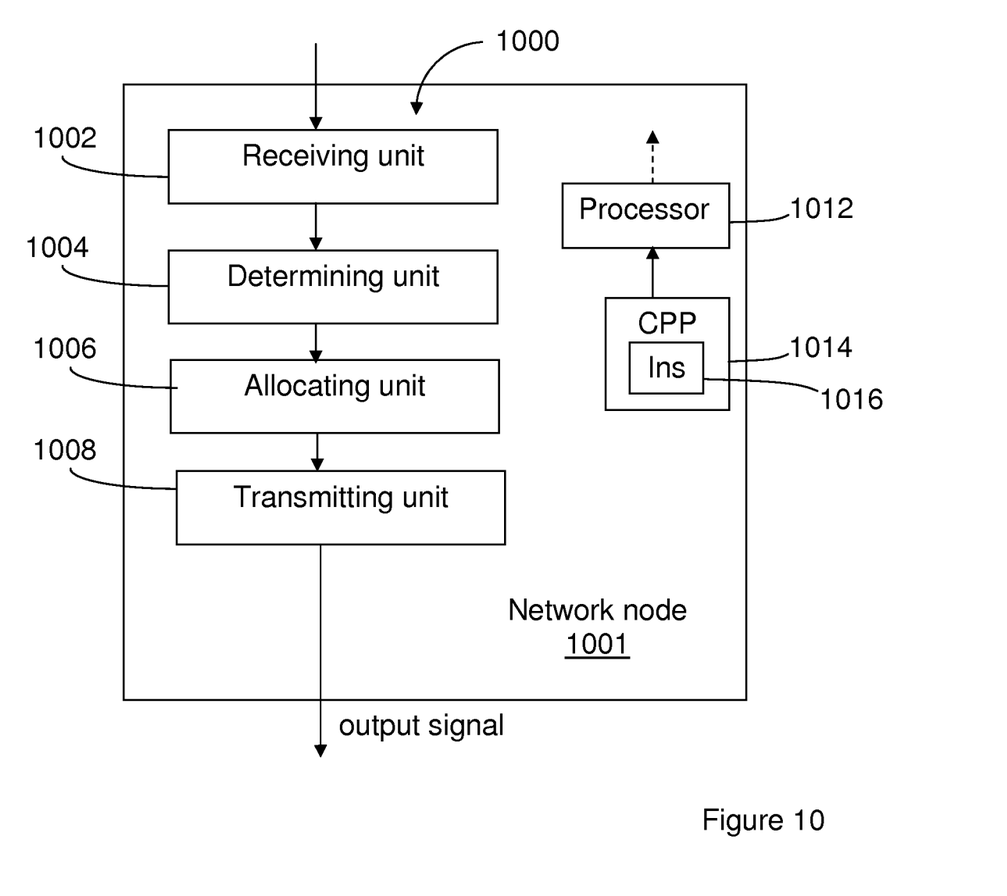
FIG. 10 is a block diagram illustrating an embodiment of an arrangement in a network node, according to an embodiment.

In FIG. 10 is also illustrated a computer program product (CPP) 1014 which comprises instructions 1016, which when executed by a processor 1012, or similar, will cause the units 1002-1010 to perform their tasks according to any embodiments of the above-described procedure. Connections between the processor 1012 and the units 1002-1010 are schematically illustrated by a dashed arrow from 1012.

Figure 11:
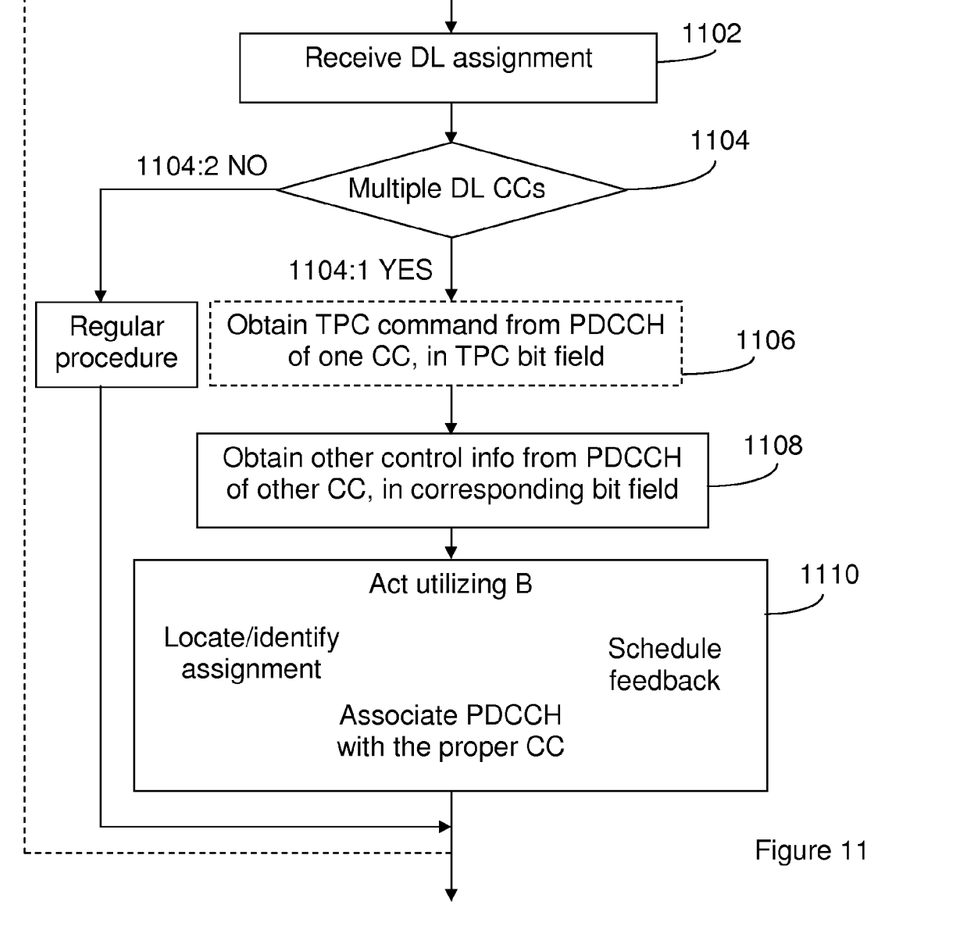
FIG. 11 is a flow chart illustrating procedure steps executed in a mobile terminal, according to an embodiment.

An embodiment in a mobile terminal in a wireless communication system supporting aggregation of component carriers, will now be described with reference to FIG. 11. Initially, control data comprising downlink resource assignments is received in a step 1102. Then, it is determined, in a next step 1104, whether the assignments concern resources on more than one downlink component carrier at the same time. When the assignments are determined 1104:1 to concern resources on at least two component carriers at the same time, a predetermined number of bits related to power control of an physical uplink control channel are obtained, in a next step 1106, from the bit field for power control in a message received on a physical downlink control channel associated with a first one of said at least two downlink component carriers. The obtaining of power control bits, here placed in step 1106, is performed also when the assignment only concerns resources on a single component carrier. Therefore, this action could alternatively be performed outside the described procedure, or before determining whether a mobile terminal has been assigned resources on more than one component carrier Independently of where the obtaining of power control bits is performed, a configuration, a set of rules or similar, concerning which CC that carries the bits related to power control is required. The possibility of an alternative position of the action performed in step 1106 is illustrated in FIG. 11 by that step 1106 is outlined with a dashed line.

In step 1108, a predetermined number of other relevant control information bits not related to power control are obtained from the corresponding bit field normally used for power control in a message received on a second physical downlink control channel associated with a second one of said at least two downlink component carriers. The obtained bits of other relevant control information not related to power control are then used in a step 1110 for locating information related to downlink or uplink transmissions. The locating of information could involve e.g. indicating certain PUCCH or PUSCH resources; extending resource block assignments or indicating which component carrier that is addressed by a certain PDCCH.

Below, an exemplary arrangement 1200 in a mobile terminal, adapted to enable the performance of the above described procedure in a mobile terminal, will be described with reference to FIG. 12. The arrangement 1200 comprises a receiving unit 1202, adapted to receive control messages comprising downlink resource assignments. The arrangement further comprises a determining unit 1204, adapted to determine whether the received assignments concern resources on more than one downlink component carrier at the same time.

The arrangement further comprises an obtaining unit 1206, adapted to obtain a predetermined number of bits related to power control of a physical uplink control channel, from the bit field for power control in a message on a first physical downlink control channel associated with a first one of said at least two downlink component carriers. The obtaining unit 1206 is further adapted to obtain, when it is determined that the received assignments concern resources on more than one downlink component carrier at the same time, a predetermined number of other relevant control information bits not related to power control. These other relevant control information bits are obtained from the corresponding bit field normally used for power control, in a message on a second physical downlink control channel associated with a second one of said at least two downlink component carriers.

The arrangement further comprises a utilizing unit 1208, adapted to use said obtained other relevant control information not related to power control for locating information related to downlink or uplink transmissions. The locating of information could involve e.g. indicating certain PUCCH or PUSCH resources; extending resource block assignments or indicating which component carrier that is addressed by a certain PDCCH. The arrangement may further comprise a transmitting unit 1210, adapted to transmit, e.g., reports related to the downlink channel conditions, to other network entities.

Figure 12:
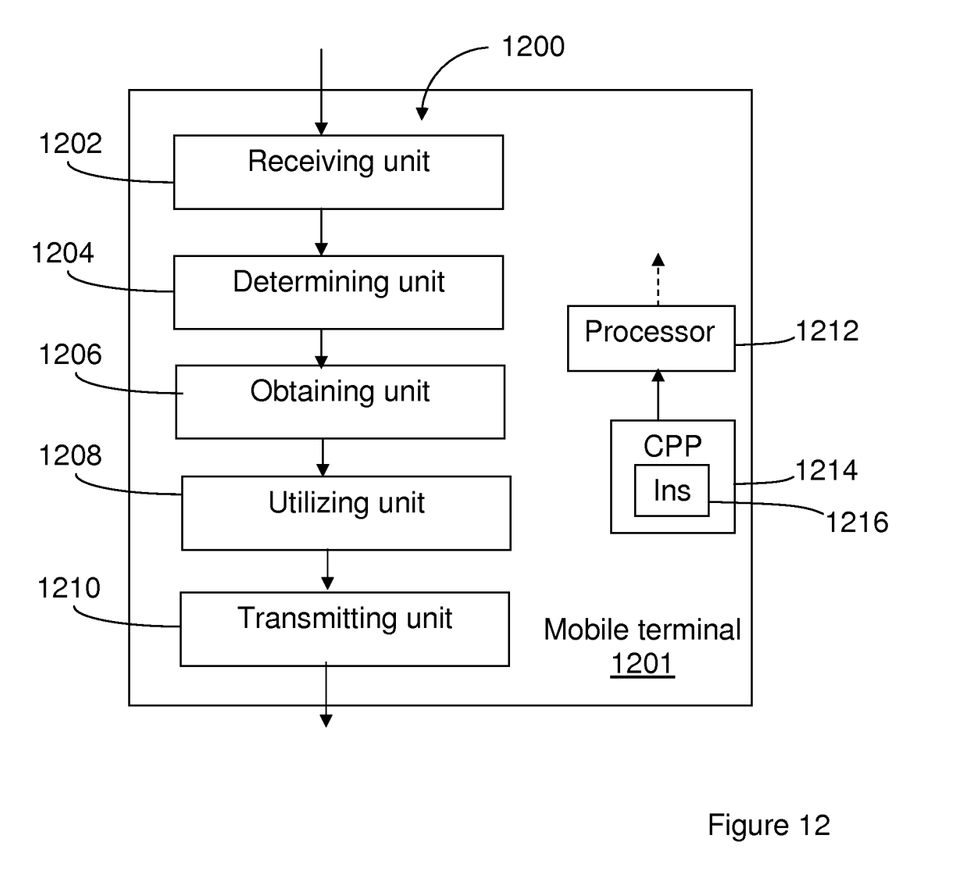
FIG. 12 is a block diagram illustrating an embodiment of an arrangement in a mobile terminal, according to an embodiment.

In FIG. 12 is also illustrated a computer program product (CPP) 1214 which comprises instructions 1216, which when executed by a processor 1212, or similar, will cause the units 1202-1210 to perform their tasks according to any embodiments of the above-described procedure. Connections between the processor 1212 and the units 1202-1210 are schematically illustrated by a dashed arrow from 1212.

In order for a mobile terminal to be able to interpret received control information correctly, it must be known to the mobile terminal on which of the PDCCHs associated with the component carriers being assigned to the mobile terminal, the true power control command can be found. This could be configured, signaled or be determined based on a set of rules. An exemplary rule could be that the true power control command is conveyed on the PDCCH associated with the component carrier having a certain carrier index, or e.g. the lowest carrier index of the component carriers being assigned to the mobile terminal. Another exemplary rule could be based on the downlink system bandwidth, e.g. that the true power control command is conveyed on the PDCCH associated with the component carrier having the most narrow bandwidth of the component carriers being assigned to the mobile terminal. If multiple DL component carriers have the same, e.g. narrow, bandwidth, a combination of multiple rules could be used. When a mobile terminal is configured with multiple CCs, the CC that is associated with the PDCCH which is to carry the true TPC command could be configured. Yet another alternative is to include information concerning the CC that is associated with the PDCCH which is to carry the true TPC command into an activation message, which is sent in order to activate a configured CC. Further, the identity of the component carrier carrying the true power control command could be explicitly signaled to the mobile terminal or indicated by a combination of explicit and implicit signaling.

Figure 13:
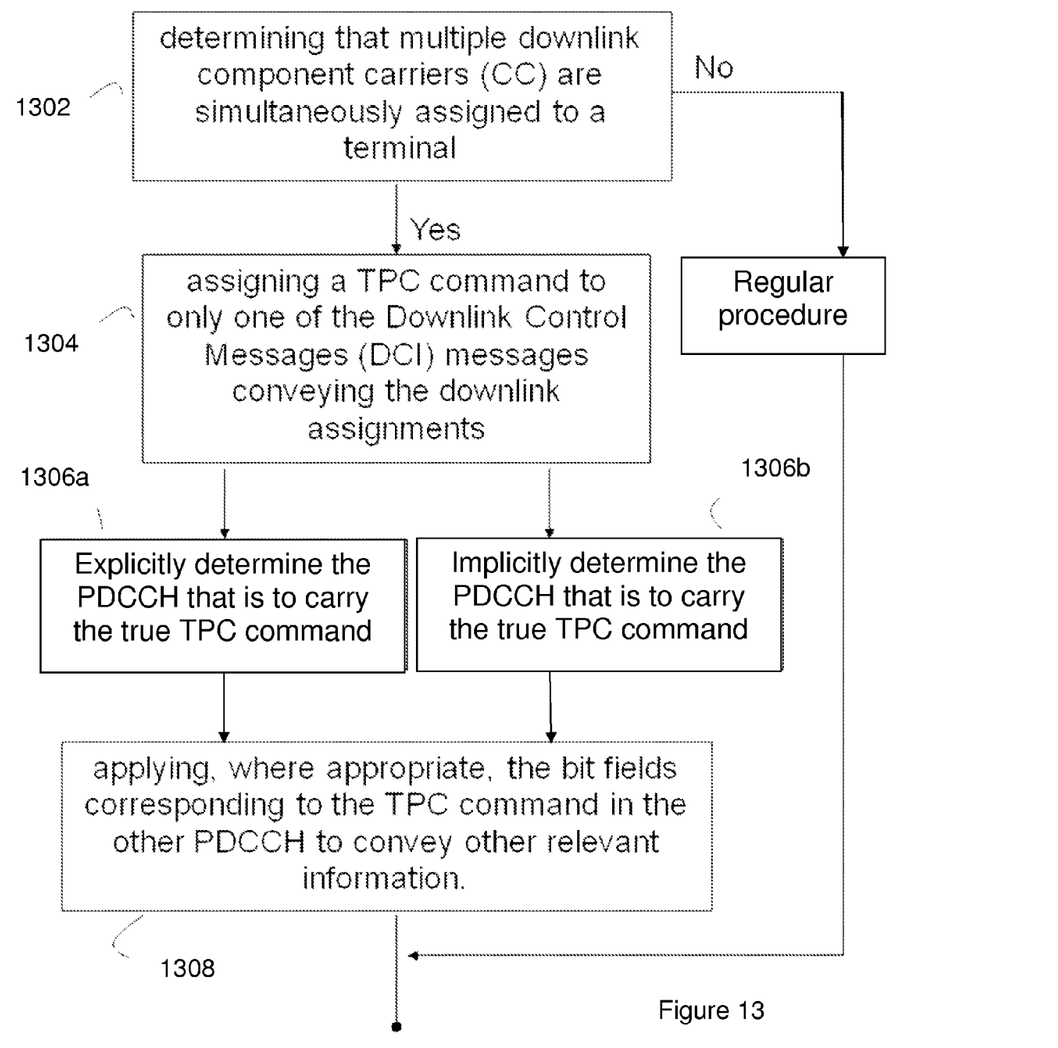
FIG. 13 is a flow chart illustrating procedure steps executed in a network node, according to an embodiment.

An embodiment in a network node of the procedure for utilizing certain resources for conveying non-redundant control information in a wireless communication system supporting aggregation of component carriers, will now be described with reference to FIG. 13. Initially, it is determined in a step 1302 whether multiple downlink component carriers are simultaneously assigned to a mobile terminal. When it is determined that multiple downlink component carriers simultaneously have been assigned to a mobile, a TPC command is assigned in a next step 1304, to only one of the downlink control messages (DCIs) conveying the downlink assignments on the respective PDCCHs associated with the component carriers. When the PDCCH which is to carry the true TPC command is explicitly configured or determined at the activation of a carrier, said PDCCH is determined, or identified, in a step 1306a. Alternatively, when the PDCCH which is to carry the true TPC command is to be determined e.g. based on a set of rules, said PDCCH is implicitly determined in a step 1306b. The determining in step 1306b could be based on a set of rules concerning e.g. the characteristics of the CC of which the PDCCH is to carry the true TPC command. The identity of the PDCCH which conveys the true TPC command is then obtained in the mobile terminal in a corresponding way. In a step 1308, when appropriate, the bit fields in the Das on the remaining PDCCHs, corresponding to the bit field carrying the true TPC command, are applied, or used, to convey other relevant information, i.e. other than the TPC command.

Below, an exemplary arrangement 1400, adapted to enable the performance of the above described procedure in a network node, will be described with reference to FIG. 14. The arrangement 1400 comprises a first circuit 1402, adapted to assign, if it has been determined that multiple downlink component carriers (CCs) 1406 are simultaneously assigned to a mobile terminal 1408, a TPC command to only one of the Downlink Control Messages (DCIs) messages associated with the respective assigned component carriers, conveying the downlink assignments. The circuit 1402 is further adapted to apply/use, where appropriate, the bit fields in the other DCI messages, corresponding to the bit field carrying the true TPC command, to convey other relevant information, i.e. other than the TPC command. The circuit 1402 could be adapted to select or determine this other relevant information, e.g. indicators to PUCCH or PUSCH resources; extensions of the resource assignment; or extension to other parameters that do not exist or are smaller in the DCI format used on the PDCCH conveying the true TPC command. The identity of the PDCCH conveying the true TPC command is then determined in the mobile terminal in a corresponding way. The identity of the PDCCH conveying the true TPC command could also be explicitly and/or implicitly signaled to the mobile terminal, as previously described.

The arrangement 1400 may also comprise a second circuit 1404 adapted to perform at least one of: determine the PDCCH that is to carry the true TPC command when it is explicitly configured; and implicitly determine the PDCCH that is to carry the true TPC command. The implicit determining could be based on one or more of component carrier (CC) index, transmission bandwidth, and DCI formats configured on the different CCs, as previously mentioned. For example, the circuit 1404 could have access to a set of rules assisting the determining.

The first circuit 1402 could further be adapted to use the bit field corresponding to the bit field carrying the true TPC command, i.e. the one also referred to as the former TPC bit field, to accommodate the carrier indicator for the PDCCHs that are not transmitted on the component carrier which they address.

Figure 14:
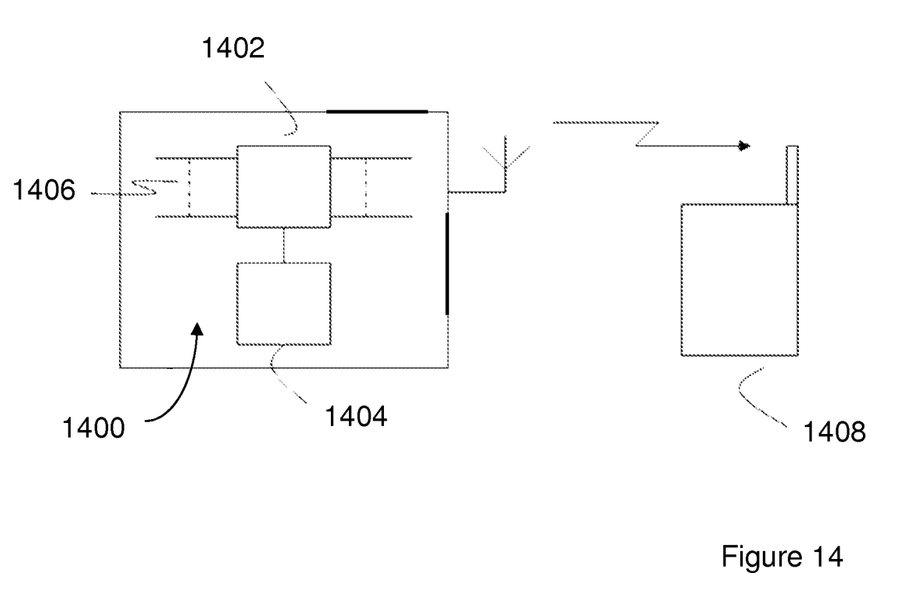
FIG. 14 is a block diagram illustrating an embodiment of an arrangement in a network node, according to an embodiment.

It should be noted that FIGS. 10, 12 and 14 merely illustrate various functional units of the arrangements 1000, 1200 and 1400 in a logical sense. The functional units could also be denoted e.g. "modules" or "circuits", or be parts of circuits. However, the skilled person is free to implement these functions in practice using any suitable software and/or hardware means, such as e.g. ASICs (Application-Specific Integrated Circuit), FPGAs (Field-Programmable Gate Array) and DSPs (Digital Signal Processor). Thus, the invention is generally not limited to the shown structure of the arrangements 1000, 1200 and 1400.

The procedure in a mobile terminal could also be described as follows:

When a received assignment is determined to concern resources on at least two component carriers, the bits in a certain bit field in a message received over a first PDCCH are interpreted as power control bits, and the bits in a corresponding bit field in a message received over a second PDCCH are interpreted as other relevant control information, i.e. other than power control. Examples of such other control information is: an indication or part of an indication of PUCCH or PUSCH resources to be used for conveying e.g. H-ARQ related information; an indication or part of an indication of resource block assignments on a DL component carrier being assigned to the mobile terminal; and an indication of to which component carrier the PDCCH carrying the indication is associated. Other parts of the resource indications could be explicitly signaled e.g. in therefore reserved bit fields in control messages, and/or, be implicitly signaled or indicated, as described in connection with other embodiments.

An exemplary advantage of the above embodiments is that overhead is reduced, since the total number of transmitted bits is kept constant while the amount of payload is increased. Furthermore, the situation is avoided where contradicting power control commands can be sent to the terminal leading to unpredictable terminal behavior. The invention also allows packing larger resource allocations/larger DCI formats into the payload size of smaller resource allocations/DCI formats, thus reducing the amount of DCI format sizes a terminal has to monitor, resulting in a reduced number of blind decodings.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The invention has mainly been exemplified using LTE terminology. However, the invention could also be applied in similar systems, such as e.g. IEEE 802.16m or 3GPP ($3^{rd}$ Generation Partnership Project) HSPA (High Speed Packet Access) supporting aggregation of component carriers, and where certain control information bit fields become redundant in a similar way as the above described TPC commands in LTE. The invention is generally defined by the following independent claims.

The invention claimed is:

1. A method in a network node of a wireless communication system supporting aggregation of component carriers, the method comprising:
   allocating bits related to power control of a physical uplink control channel in a bit field for power control in a message on a first physical downlink control channel associated with a first downlink component carrier;
   when resources on at least two downlink component carriers are assigned to a mobile terminal at the same time, allocating other control information bits not related to power control in a bit field, corresponding to the bit field used for power control in the message on the first physical downlink control channel, in a message on a second physical downlink control channel associated with a second one of the at least two downlink component carriers; and
   transmitting the allocated control information to the mobile terminal;
   wherein the control information bits not related to power control are related to at least one of indication of resources on a physical uplink control channel, indication of resources on a physical uplink shared channel, indication of with which component carrier a certain physical downlink control channel is associated, extension of downlink resource assignment, extension of other parameter of a control message, extension of a partially implicitly indicated parameter, and extending a control message with a new parameter.

2. The method of claim 1, further comprising determining which of the physical downlink control channels associated with the respective component carriers assigned to the mobile terminal is to carry the bits related to power control.

3. The method of claim 2, wherein the physical downlink control channel that is to carry the bits related to power control is determined based on a set of rules.

4. The method of claim 3, wherein the rules concern at least one of a certain component carrier index, a carrier index relation, a bandwidth of a component carrier, a configuration of a message on a physical downlink control channel, and a transmission mode of a component carrier.

5. The method of claim 2, wherein an identity of the physical downlink control channel carrying the bits related to power control is implicitly indicated to the mobile terminal.

6. The method of claim 5, wherein an implicit indication is based on at least one of a certain component carrier index, a carrier index relation, a bandwidth of a component carrier, a configuration of a message on a physical downlink control channel, and a transmission mode of a component carrier.

7. The method of claim 2, wherein an identity of the physical downlink control channel carrying the bits related to power control is explicitly configured.

8. The method of claim 7, wherein an identity of the physical downlink control channel carrying the bits related to power control is, at least partially, explicitly signaled to the mobile terminal.

9. An arrangement in a network node of a wireless communication system supporting aggregation of component carriers, the arrangement comprising:
   a determining unit configured to determine if resources on at least two downlink component carriers are assigned to a mobile terminal at the same time,
   an allocating unit configured to allocate bits related to power control of a physical uplink control channel in a bit field for power control in a message to be transmitted on a first physical downlink control channel associated with a first downlink component carrier, wherein the allocating unit is further configured to allocate, when resources on at least two downlink component carriers are determined to be assigned to the mobile terminal, other control information bits not related to power control in a bit field corresponding to the bit field used for power control in the message on the first physical downlink control channel in a message on a second physical downlink control channel associated with a second one of the at least two downlink component carriers, and
   a transmitting unit configured to transmit the allocated control information to the mobile terminal assigned resources on the at least two downlink component carriers,
   wherein the allocating unit is configured to allocate bits in the bit field in the message on the second physical downlink control channel, and the bits allocated relate to at least one of indication of resources on a physical uplink control channel, indication of resources on a physical uplink shared channel, indication of with which component carrier a certain physical downlink control channel is associated, extension of downlink resource assignment, extension of other parameter of a control message, extension of a partially implicitly indicated parameter, and extending a control message with a new parameter.

10. The arrangement of claim 9, wherein the arrangement is further configured to determine which of the physical downlink control channels associated with the respective component carriers assigned to the mobile terminal that is to carry the bits related to power control.

11. The arrangement of claim 10, wherein the arrangement is configured to determine which physical downlink control channel that is to carry the bits related to power control based on a set of rules.

12. The arrangement of claim 11, wherein the rules concern at least one of a certain component carrier index, a carrier index relation, a bandwidth of a component carrier, a configuration of a message on a physical downlink control channel, and a transmission mode of a component carrier.

13. The arrangement of claim 10, wherein the arrangement is further configured to implicitly indicate an identity of the physical downlink control channel carrying the bits related to power control to the mobile terminal.

14. The arrangement of claim 13, wherein the identity is implicitly indicated based on at least one of a certain component carrier index, a carrier index relation, a bandwidth of a component carrier, a configuration of a message on a physical downlink control channel, and a transmission mode of a component carrier.

15. The arrangement of claim 10, wherein the arrangement is further configured to, at least partially, explicitly signal an identity of the physical downlink control channel carrying the bits related to power control to the mobile terminal.

16. A method in a mobile terminal of a wireless communication system supporting aggregation of component carriers, the method comprising:
    obtaining bits related to power control of a physical uplink control channel from a bit field for power control in a message on a first physical downlink control channel associated with a first downlink component carrier, and
    when receiving assignments for resources on at least two downlink component carriers at the same time:
    obtaining other control information bits not related to power control from a bit field corresponding to the bit field for power control in the message on the first physical downlink control channel in a message on a second physical downlink control channel associated with a second one of the at least two downlink component carriers, and
    using the obtained other control information not related to power control for locating information related to downlink or uplink transmissions,
    wherein the information bits not related to power control are interpreted as at least one of indication of resources on a physical uplink control channel, indication of resources on a physical uplink shared channel, indication of with which component carrier a certain physical downlink control channel is associated, extension of downlink resource assignment, extension of other parameter of a control message, extension of a partially implicitly indicated parameter, and extension of a control message with a new parameter.

17. The method of claim 16, wherein the physical downlink control channel which carries the bits related to power control is identified based on a set of rules.

18. The method of claim 17, wherein the rules concern at least one of a certain component carrier index, a carrier index relation, a bandwidth of a component carrier, a configuration of a message on a physical downlink control channel, and a transmission mode of a component carrier.

19. The method of claim 16, wherein an identity of the physical downlink control channel carrying the bits related to power control is explicitly configured.

20. The method of claim 19, wherein an identity of the physical downlink control channel carrying the bits related to power control is determined, at least partially, based on explicit signaling from a network node.

21. An arrangement in a mobile terminal of a wireless communication system supporting aggregation of component carriers, the arrangement comprising:
    a determining unit configured to determine if resources on at least two downlink component carriers are assigned to the mobile terminal at the same time based on received data,
    an obtaining unit configured to obtain bits related to power control of a physical uplink control channel from a bit field for power control in a message on a first physical downlink control channel associated with a first downlink component carrier, wherein the obtaining unit is further configured to obtain, when it has been determined that resources on at least two downlink component carriers have been assigned to the mobile terminal, other control information bits not related to power control from a bit field corresponding to the bit field for power control in the message on the first physical downlink control channel in a message on a second physical downlink control channel associated with a second one of the at least two downlink component carriers, and
    a utilizing unit configured to use the obtained other control information not related to power control for locating information related to downlink or uplink transmissions,
    wherein the arrangement is further configured to interpret the information bits not related to power control as at least one of indication of resources on a physical uplink control channel, indication of resources on a physical uplink shared channel, indication of with which component carrier a certain physical downlink control channel is associated, extension of downlink resource assignment, extension of other parameter of a control message, extension of a partially implicitly indicated parameter, and extension of a control message with a new parameter.

22. The arrangement of claim 21, wherein the arrangement is further configured to identify the physical downlink control channel which carries the bits related to power control based on a set of rules.

23. The arrangement of claim 22, wherein the rules concern at least one of a certain component carrier index, a carrier index relation, a bandwidth of a component carrier, a configuration of a message on a physical downlink control channel, and a transmission mode of a component carrier.

24. The arrangement of claim 21, wherein the arrangement is further configured to identify the physical downlink control channel which carries the bits related to power control at least partially based on explicit signaling from a network node.

* * * * *